United States Patent [19]

Stewart et al.

[11] Patent Number: 5,076,667
[45] Date of Patent: Dec. 31, 1991

[54] HIGH SPEED SIGNAL AND POWER SUPPLY BUSSING FOR LIQUID CRYSTAL DISPLAYS

[75] Inventors: Roger G. Stewart, Neshanic Station; Alfred C. Ipri, Princeton, both of N.J.

[73] Assignee: David Sarnoff Research Center, Inc., Princeton, N.J.

[21] Appl. No.: 471,566

[22] Filed: Jan. 29, 1990

[51] Int. Cl.$^5$ .............................................. G02F 1/13
[52] U.S. Cl. ..................................... 359/54; 340/784; 359/80; 359/87
[58] Field of Search ................ 350/334, 336, 343, 333, 350/332; 340/784, 765, 713

[56] References Cited

U.S. PATENT DOCUMENTS

| | | | |
|---|---|---|---|
| 4,118,110 | 10/1978 | Saurer et al. | 350/334 |
| 4,597,160 | 7/1986 | Ipri | 29/571 |
| 4,682,858 | 7/1987 | Kanbe et al. | 350/334 |
| 4,776,673 | 10/1988 | Aoki et al. | 350/334 |
| 4,807,973 | 2/1989 | Kawasaki | 350/334 |
| 4,838,654 | 6/1989 | Hamaguchi et al. | 350/332 |

FOREIGN PATENT DOCUMENTS 56-78818  6/1981  Japan ................................ 350/336

OTHER PUBLICATIONS

Kamikawa, "Electronic Displays", IEEE Press, H. I. Refioglu, Editor, 1983, pp. 70–71.
Yamazaki et al., "Electronic Displays", IEEE Press, H. I. Refioglu, Editor, 1983, pp. 129–130.

Primary Examiner—Rolf Hille
Assistant Examiner—Minhloan Tran
Attorney, Agent, or Firm—William J. Burke

[57] ABSTRACT

A Liquid Crystal Display device has first and second transparent substrates with a liquid crystal material sealed therebetween; a centrally disposed optically active display region having a matrix of pixels and a first and second scanner, and a transparent common electrode formed on the inner surface of the first and second transparent substrates, respectively; and a power supply and data signal distribution region surrounding at least a portion of the optically active display region and near the first and second scanners. The power supply and data signal distribution region comprises (a) a groove, and (b) a plurality of parallel conductors, formed on the inner surface of the second and first transparent substrates, respectively, which conductors include a height extending into the groove to reduce each conductor's resistance. Conductor capacitance is reduced by (a) eliminating the transparent common electrode from the groove, and/or (b) providing an inert dielectric material or gas in the distribution region with a lower dielectric constant than the liquid crystal material.

16 Claims, 2 Drawing Sheets

HIGH SPEED SIGNAL AND POWER SUPPLY BUSSING FOR LIQUID CRYSTAL DISPLAYS

This invention was made with Government support under Contract No. F33615-88-C-1825 awarded by the Department of the Air Force. The Government has certain rights in this invention.

FIELD OF THE INVENTION

The present invention relates to high speed signal and power bussing techniques for liquid crystal displays, and more particularly to low resistance power supply and high speed data distribution conductors that service an interior optically active display region.

BACKGROUND OF THE INVENTION

Liquid Crystal Display (LCD) devices have found increasing use in areas such as watches, calculators, computers and television screens. A typical LCD device is shown in U.S. Pat. No. 4,776,673, issued to S. Aoki et al. on Oct. 11, 1988. The typical LCD device comprises opposed transparent substrates of glass, or the like, which are spaced apart by a small distance and sealed along the edges to contain a liquid crystal material therebetween. A plurality of display electrodes and associated thin film transistors, for providing switching, are formed in a matrix on the inner surface of the first opposing transparent substrate. A transparent common electrode layer is formed on the second opposing transparent substrate to form a capacitor with each of the plurality of display electrodes of the matrix. Each display electrode and associated transistor form a "pixel" of the display matrix.

Scanned flat panel LCD devices, such as the LCD device shown in Aoki et al. and described above, also include data and select scanners to enable the pixels to form the display image. Such data and select scanners require power, high speed clock and data signals to properly operate the pixels of the optically active region. To provide such power, clock and data signals, distribution of power supply lines, high speed clock lines, and data lines are usually provided around the optically active region within the liquid crystal material area and between the two transparent substrates. Such lines can cover distances of up to approximately two meters to supply the necessary signals to data and select scanners for operating the optically active display region to provide a display image.

The problem is that even when lightly loaded, the intrinsic Resistance-Capacitance (RC) delay associated with conventional 1 micron thick aluminum signal and power lines is in some applications too high for routing more than a distance of 10 to 20 centimeters on an LCD plate or substrate. These sized lines are especially not suitable for routing the necessary high speed lines around the large plates or substrates needed for applications such as high definition television and computer work stations. Additionally, the conductor thickness cannot be increased significantly without increasing the liquid crystal spacing between the two opposed transparent substrates, and thereby degrading the optical performance of the display. Additionally, widening the conductors decreases the resistance but increases the capacitance with the transparent electrode formed on the opposite transparent substrate and, as a result, does not provide a solution to the problem.

It is desirable to have high speed signal and power supply bussing for an LCD device which can provide reasonably low resistance conductors and a reasonably low RC time constant so as not to degrade the optical performance of the display.

SUMMARY OF THE INVENTION

The present invention is directed to a Liquid Crystal Display (LCD) device comprising an optically active display region and a power supply and data signal distribution region which is adapted to include low resistance and capacitance conductors for optimizing the optically active display region to produce the display images. More particularly, the power supply and data signal distribution region includes a groove formed in one of the opposing transparent substrates wherein one or more power supply conductors and one or more data signal conductors of the bus are routed in parallel. In such groove area, each supply conductor can have increased height to reduce its resistance without increasing its width which increases the capacitance as it decreases the resistance.

It is an aspect of the present invention that the area of the groove can include the liquid crystal material, or be arranged to include any other dielectric material such as an inert gas with a dielectric constant that is less than the liquid crystal material. It is a further aspect of the present invention that the transparent common electrode on the second opposing substrate can also be eliminated in the area of the groove. The lower dielectric constant material and the elimination of the transparent common electrode in the area of the groove and conductors combine to reduce the capacitance of the conductors, and thereby further reduce the intrinsic RC delay of the conductors.

Viewed from another aspect the present invention is directed to liquid crystal display apparatus comprising first and second spaced-apart transparent substrates which define a region therebetween that is adapted to house optical transmission devices. A seal existing between the first and second substrates which isolates the region adapted to house the optical transmission devices from the other regions. Liquid crystal material existing in the region adapted to house optical devices. The regions between the first and second substrates and not including the sealed off region being adapted to house power supply and/or data signal conductors which have relatively low resistance and capacitance associated therewith.

The invention will be better understood from the following more detailed description taken with the accompanying drawings and claims.

The drawings are not necessarily to scale.

DETAILED DESCRIPTION

Figure 1:
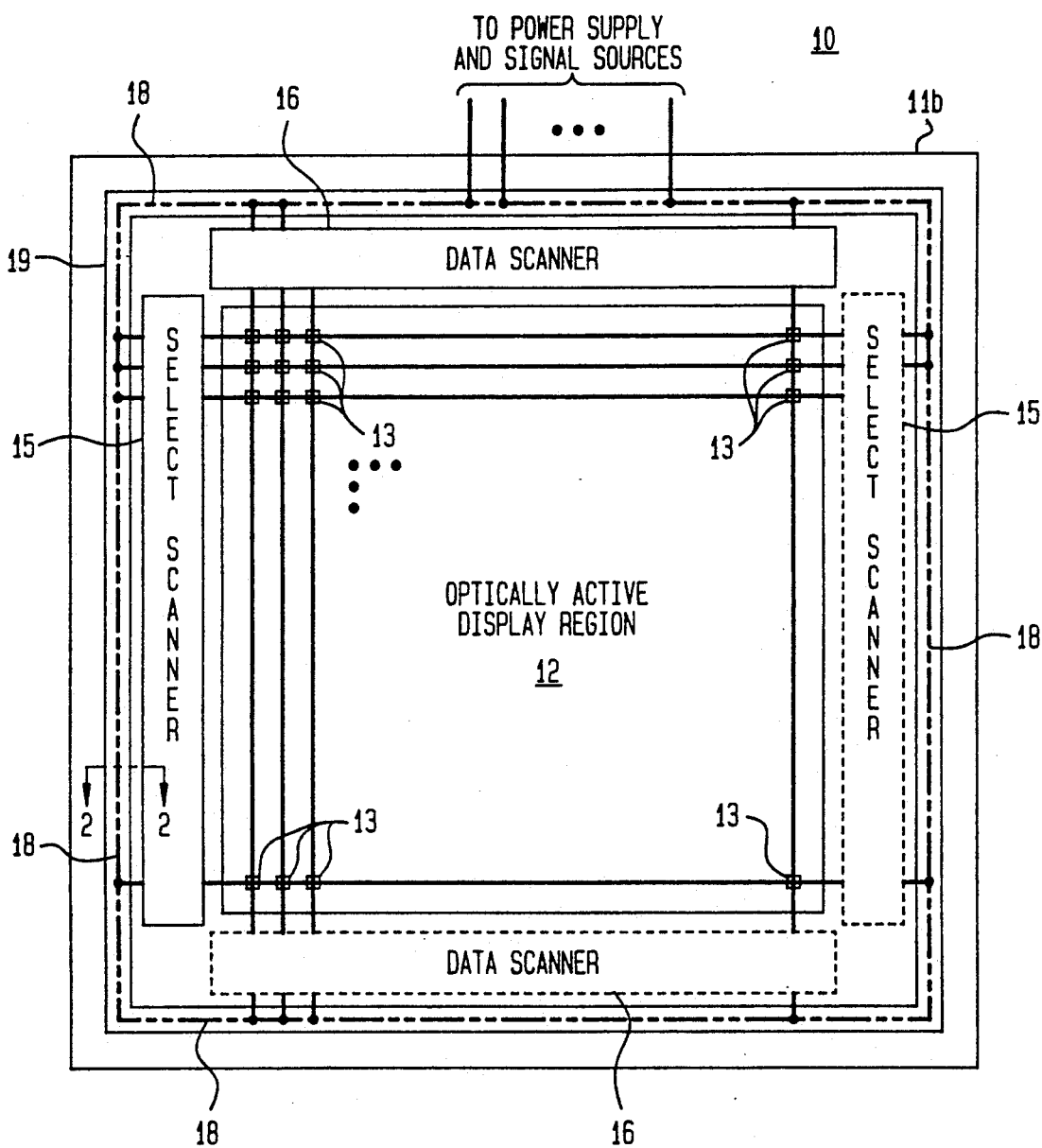
FIG. 1 is a block diagram layout of a typical Liquid Crystal Display (LCD) device in accordance with the present invention.

Referring now to FIG. 1, there is shown a block diagram of a top view of a Liquid Crystal Display (LCD) device 10 comprising a first and a second opposing transparent substrate 11, formed of glass or other suitable transparent substrate material 26 with a liquid crystal material (shown only in FIG. 2 which is discussed hereinbelow) sealed therebetween. A central area of device 10 comprises a liquid crystal cell forming an optically active display region 12 including a matrix of pixels 13. In a typical embodiment each pixel 13 comprises a thin film field effect transistor (not shown) and a display electrode (not shown) on the first transparent substrate, which display electrode forms a capacitor with a transparent common electrode disposed on the inner surface of the second transparent substrate, as shown, for example, in U.S. Pat. No. 4,776,673 to Aoki et al.

The transistors (not shown) of the pixels include (a) a drain electrode connected to the associated display electrode, (b) a gate electrode which is interconnected to both the gate electrodes of the other transistors in a row of the matrix of pixels and to a select scanner 15, and (c) a source electrode which is connected to both the source electrodes of the other transistors in an associated column of the matrix of pixels and to a data scanner 16. The combination of the select scanner 15 and the data scanner 16 enable the various pixels 13 of the matrix to appropriately render the liquid crystal material 26 between the capacitor plates, formed by the display electrode and the transparent common electrode, either transparent, light blocking, or some degree therebetween. It is to be understood that in FIG. 1, the select scanner 15 can be placed on either the left or right side of optically active display region 12, and is shown with dashed lines on the right side to indicate such possible placement. Similarly, data scanner 16 can be optionally placed at the top or bottom of optically active display region 12 and is shown with dashed lines at the bottom or the array of pixels to indicate such possible placement. The arrangement described above for the LCD device is well known as shown, for example, in U.S. Pat. No. 4,776,673, and the article entitled "A Liquid Crystal TV Display Panel With Drivers" by T. Yamazaki et al. in the book *Electronic Displays*, by H. I. Refioglu, IEEE Press, 1983, at pages 129-130.

In order for the select scanner 15 and the data scanner 16 to provide the desired display image in optically active display region 12, appropriate power supply and high speed data signals need to be distributed to these scanners. Such power supply and high speed data signals are provided to the select and data scanners via a separate plurality of conductors in a bus (a group of conductors) 18.

In conventional LCD devices these conductors are routed to the select and data scanners 15 and 16 within the limited vertical space between first and second transparent substrates 11. However, because of the minimum spacing of only a few microns between the first and second transparent substrates of these conventional LCD devices, the prior art power supply and high speed data conductors are limited to a maximum of approximately 1 micron thick. These conductors are, therefore, limited with respect to width and height. The resistance and capacitance of these conductors limits performance of transistors and other electrical components (all of which are not shown). It is to be understood that such conductors in bus 18 can be formed from aluminum or any other suitable material.

Figure 2:
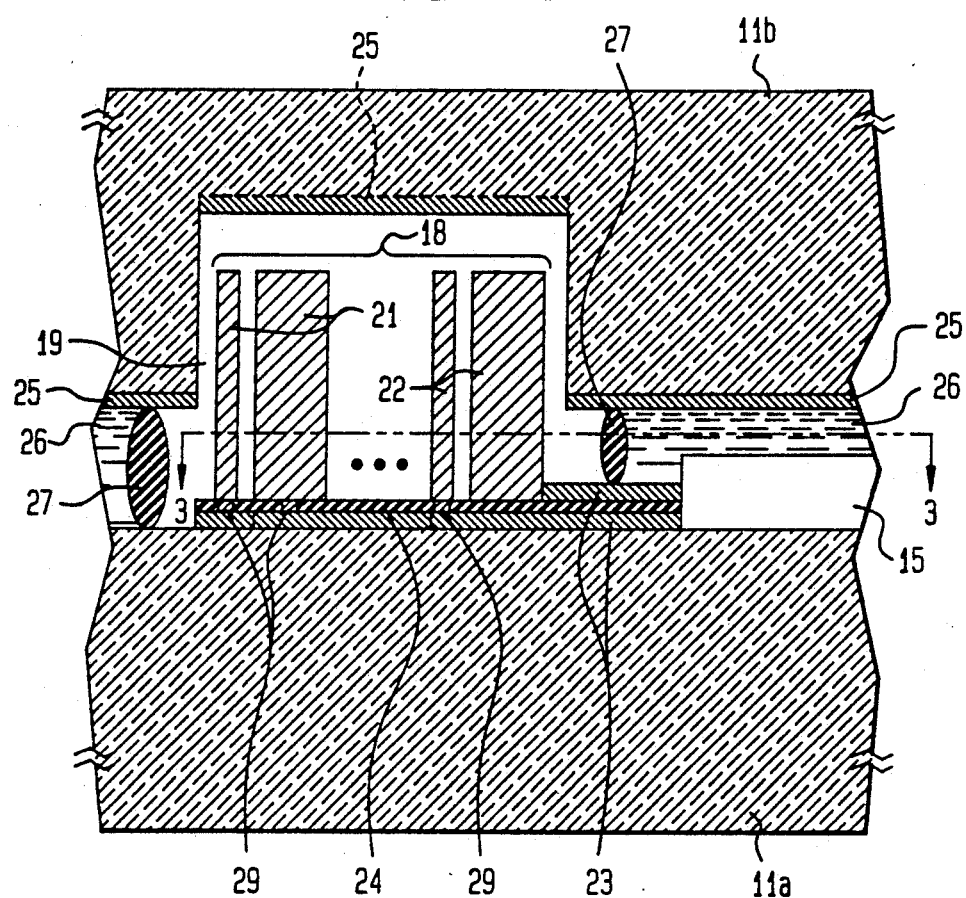
FIG. 2 is a cross-sectional view of a portion of the power supply and data signal distribution region of the LCD device of FIG. 1.
Figure 3:
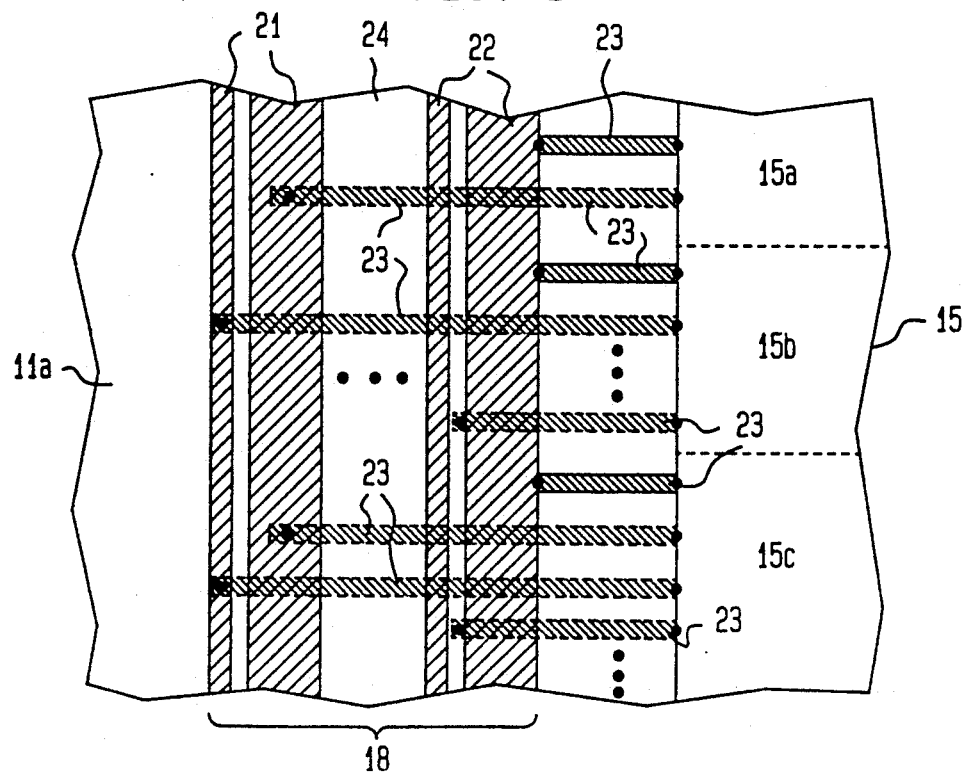
FIG. 3 is a top view of a portion of the power supply and data signal distribution region of FIG. 2.

In accordance with the present invention, and as shown in FIG. 1, the power supply and high speed data signal conductors are formed near the outer edges of transparent substrates 11a and 11b (11b is shown in FIGS. 1 and 2, 11a is shown in FIGS. 2 and 3) as bus 18 within a region of a groove 19 formed in one of the first or second transparent substrates 11. The groove 19 is shown in FIG. 1 as disposed parallel to all four edges of the first and second substrates, but it is to be understood that such groove need only traverse the distance necessary to provide the power supply and high speed data signals to each of the select and data scanners 15 and 16 if desired.

Referring now to FIG. 2, there is shown a cross-sectional view of a section of LCD device 10 in the area of bus 18 and select scanner 15 in accordance with the present invention taken through the line 2—2 of FIG. 1. In FIG. 2, the bottom or first transparent substrate 11a has formed thereon bus 18 including one or more high speed data signal conductors 21 and one or more power supply conductors 22, select scanner 15, and leads 23 to interconnect power supply and high speed data signal conductors with standard circuitry (not shown) of select scanner 15 shown here only in block form. Where leads 23 tunnel under conductors 21 and/or 22 to connect a conductor to select scanner 15, an insulation layer 24 is provided to prevent a shorting of tunneling lead 23 to other conductors 21 or 22 it passes underneath of. In accordance with the preferred embodiment of the present invention, the top or second opposing transparent substrate 11b has formed on the inner surface thereof, (a) the transparent common electrode, or ground plane, 25, and (b) the groove, or channel, 19 above the power supply and high speed data bus 18 distribution region.

The groove (channel) 19 is formed in, and around the perimeter of, second transparent substrate 11b by etching or any other suitable method, as, for example, by machining. As an example, the first and second transparent substrate 11a and 11b can have a thickness of 250 microns; and the groove 19 might have a width of 2000 microns and a depth of 20 microns when formed in second transparent substrate 11b. The groove 19 permits conventional 1 micron thick conductors 21 and 22, as found in prior art LCD devices, to be supplemented to a height of perhaps 10 microns within the area of the groove 19, and thereby provide a much lower sheet resistance without increasing the width of a conductor which increases the capacitance with transparent common electrode 25.

As found in the prior art LCD devices, the area encompassing power supply and high speed data bus 18 and groove 19 can be filled with the liquid crystal material. However, in accordance with a preferred embodiment of the present invention, the liquid crystal material 26 is eliminated from the area of groove 19 with seals 27, and the area of groove 19 is filled with any other suitable lower dielectric constant material such as an inert gas. The elimination of the liquid crystal material 26 enables a reduction of the dielectric constant from a normal value of around 10 for the liquid crystal material down to, for example, 1 for an inert gas. Additionally, as is indicated by the dashed line, the common transparent electrode 25 can be eliminated from the area of groove 19 to reduce the conductor 21 and 22 capacitance with the common transparent electrode 25. This lower dielectric constant plus the elimination of the transparent common electrode, or ground plane, combine to reduce the capacitance by a factor of, for example, 5 to 10. Therefore, the RC delays can be as much as 50 to 100 times lower than they would be with a conventional 1 micron thick aluminum line which is routed through the liquid crystal material in the interior of the LCD device. This provides up to a 100 fold reduction of the RC delays for routing high speed data signals and a ten fold decrease in the resistance of the power lines.

Referring now to FIG. 3, there is shown a portion of FIG. 2 taken through lines 3—3 which shows leads 23 interconnecting various high speed data signal conductors 21 and power supply conductors 22 to various exemplary circuits or sections 15a, 15b or 15c of select scanner 15. More particularly, each interconnecting lead 23 is connected with a via conductor 29 through insulation layer 24, where necessary, to the desired conductor 21 or 22. It is to be understood that the conductor closest to select scanner 15 can be directly connected to the circuits or sections 15a, 15b or 15c on top of insulation layer 24 since such interconnecting leads 23 need not tunnel under other conductors 21 or 22. In general, such closest conductor 22 might be the ground conductor which may have more connections to the various circuits or sections of select and data scanners 15 and 16, respectively, than any of the other one or more of the high speed data signal conductors 21 and power supply conductors 22.

It is to be understood that the specific embodiments described herein are intended merely to be illustrative of the spirit and scope of the invention. Modifications can readily be made by those skilled in the art consistent with the principles of this invention. For example, the benefit of reduced capacitance can be achieved by using a low dielectric constant material in the region housing the power supply and data signal conductors 21 and 22 without using a grove 19 in substrate 11b. Still further, a benefit of reduced capacitance can be achieved without the use of the groove 19 or a material having a dielectric constant lower than that of the liquid crystal display material by not using a ground plane 25 in the area in which the power supply and data signal conductors exist.

What is claimed is:

1. Liquid crystal display apparatus comprising:
   first and second spaced-apart transparent substrates;
   a plurality of optical transmission devices formed in a first region between the first and second substrates;
   liquid crystal material having a predetermined dielectric constant and disposed in the first region containing the optical transmission devices;
   driving scanner means for transmitting signals to the plurality of optical transmission devices for producing a desired display image;
   a plurality of conductors for supplying power supply and data signals tot he driving scanner means, the conductors being disposed in at least one second region located between the first and second substrates and around at least a portion of, and not including, the first region; and
   permitting means disposed in the at least one second region for permitting a relatively low intrinsic resistance-capacitance delay to be obtained for the plurality of conductors.

2. The liquid crystal display apparatus of claim 1 wherein the permitting means comprises a groove formed in one of the substrates in at least a portion of the at least one second region in which the power supply and data signal conductors are disposed into which at least some of the conductors extend to provide an increased height relative to a predetermined width for each conductor and thereby provide a reduced resistance in each conductor extending into the groove.

3. The liquid crystal display apparatus of claim 1 wherein
   the first region has a ground plane formed on an inner surface of one of one of the substrates, and
   the permitting means comprises an absence of the ground plane over the power supply and data signal conductors in the at least one second region for providing a reduced capacitance between each conductor and the nearest area of the ground plane in the first region instead of a ground plane in the second region.

4. The liquid crystal display apparatus of claim 1 wherein the permitting means comprises a material which has a dielectric constant which is lower than the dielectric constant of the liquid crystal display material and fills at least a portion of the at least one second region in which the power supply and data signal conductors are disposed for providing a reduced capacitance between each conductor and its surrounding environment.

5. The liquid crystal display apparatus of claim 1 further comprising:
   a first seal disposed between the first and second substrates which isolates the first region from other regions; and
   a second seal disposed between the first and second substrates which isolates at least a portion of the at least one second region in which the power supply and data signal conductors are disposed from the first region and any other regions between the first and second substrates.

6. The liquid crystal display apparatus of claim 5 wherein the at least a portion of the at least one second region isolated by the first and second seals in which at least a portion of the power supply and data signal conductors are disposed contains a material having a dielectric constant which is less than the dielectric constant of the liquid crystal material.

7. The liquid crystal display apparatus of claim 1 wherein:
   the permitting means comprises a groove formed in one of the substrates into which at least one of the conductors extends;
   the first region has a ground plane formed on an inner surface of one of the substrates; and
   the apparatus further comprises:
   a seal disposed between the first and second substrates that isolates at least a portion of the at least one second region in which the power supply and data signal conductors are disposed from the first region in which the optical transmission devices are disposed; and
   a material having a dielectric constant which is lower than the dielectric constant of the liquid crystal material, the material being disposed in the at least one second region isolated by the seal.

8. A liquid crystal display device comprising:
   first and second spaced-apart transparent substrates with a hermetic seal around a periphery between the first and second substrates;
   a liquid crystal material filling a first region disposed in at least a portion of a volume between the substrates;
   a plurality of optical transmission devices disposed in the first region for forming an optically active display region between the first and second transparent substrates;

driving scanner means for transmitting signals to the plurality of optical transmission devices for producing a desired display image in the optically active display region; and a power supply and data signal distribution region disposed around at least a portion of the optically active display region and within the periphery of the first and second transparent substrates, the power supply and data signal distribution region comprising:

a bus including a plurality of conductors for providing predetermined power supply and data signals to the driving scanner means; and permitting means for permitting a relatively low intrinsic resistance-capacitance delay to be obtained for the plurality of conductors.

9. The liquid crystal display device of claim 8 wherein the permitting means of the power supply and data signal distribution region comprises a groove formed in one of the first and second transparent substrates; and the plurality of conductors of the bus are formed on the other one of the first and second transparent substrates, and at least a portion of the plurality of conductors extend into the groove to provide an increased height relative to a predetermined width for each conductor and thereby provide a reduced resistance in each conductor extending into the groove.

10. The liquid crystal display device of claim 9 wherein the transparent substrate comprising the groove further comprises a transparent conductive common electrode layer on an inner surface thereof; and the permitting means comprises an absence of the transparent conductive common electrode layer over the power supply and data signal conductors in the power supply and data signal distribution region for providing a reduced capacitance between each conductor and the nearest area of the common electrode layer in the first region instead of a common electrode layer in the power supply and data signal distribution region.

11. The liquid crystal display of claim 8 wherein the power supply and data signal distribution region is enclosed with a seal to prevent liquid crystal material disposed in the first region from entering therein and is filled with a material which has a lower dielectric constant than the liquid crystal material.

12. The liquid crystal display device of claim 9 wherein:

the transparent substrate comprising the groove further comprises a transparent conductive common electrode layer on an inner surface thereof;

the permitting means comprises an absence of the transparent conductive common electrode layer over the power supply and data signal conductors in the power supply and data signal distribution region for providing a reduced capacitance between each conductor and the nearest area of the common electrode layer in the first region instead of a common electrode layer in the power distribution and data signal region; and the power supply and data signal distribution region is enclosed with a seal to prevent the liquid crystal material from entering therein and is filled with a material which has a lower dielectric constant than the liquid crystal material.

13. A power supply and data signal distribution region disposed between first and second opposing transparent substrates of a liquid crystal display device for supplying power and data signals to an optically active display region of the liquid crystal display device, the power supply and data signal distribution region comprising:

a groove formed in the first transparent substrate around at least a portion of the optically active display region; and a bus comprising a plurality of power supply and data signal conductors which are formed on the second transparent substrate, at least a portion of the plurality of power supply and data signal conductors have a height which extends into the groove in the first transparent substrate to provide conductors which are characterized by a relatively low intrinsic resistance-capacitance delay.

14. The power supply and data signal distribution region of claim 13 wherein the first transparent substrate comprises a conductive common transparent electrode layer disposed on the inner surface in an area of the optically active display region.

15. The power supply and data signal distribution region of claim 14 further comprising:

a hermetic seal disposed between the first and second transparent substrates and encircling at least a portion of the power supply and data signal distribution region for preventing liquid crystal material from entering therein; and a material with a lower dielectric constant than a liquid crystal material found in the optically active display region which fills the portion of the power supply and data signal distribution region between the first and second transparent substrates encircled by the hermetic seal.

16. Liquid crystal display apparatus comprising:

first and second spaced-apart transparent substrates;

an array of a plurality of optical transmission devices disposed in a first region between the first and second transparent substrates;

a seal disposed between the first and second substrates which isolates the first region from other regions disposed between the first and second transparent substrates;

liquid crystal material disposed in the first region containing the optical transmission devices;

driving scanner means for transmitting signals to the plurality of optical transmission devices for producing a desired display image in the first region; and a plurality of power supply and data signal conductors disposed in at least one second region formed around at least a portion of the first region outside the seal; and permitting means disposed in the at least one second region in an area of at least a portion of the plurality of power supply and data signal conductors for permitting a relatively low intrinsic resistance-capacitance delay to be obtained for the plurality of conductors for providing optimized predetermined signals to the driving scanner means.

* * * * *